Jan. 10, 1933.　　　　J. KANTOR　　　　1,893,746
PROPELLER FOR BOTTLE FILLING MACHINES
Filed July 16, 1930
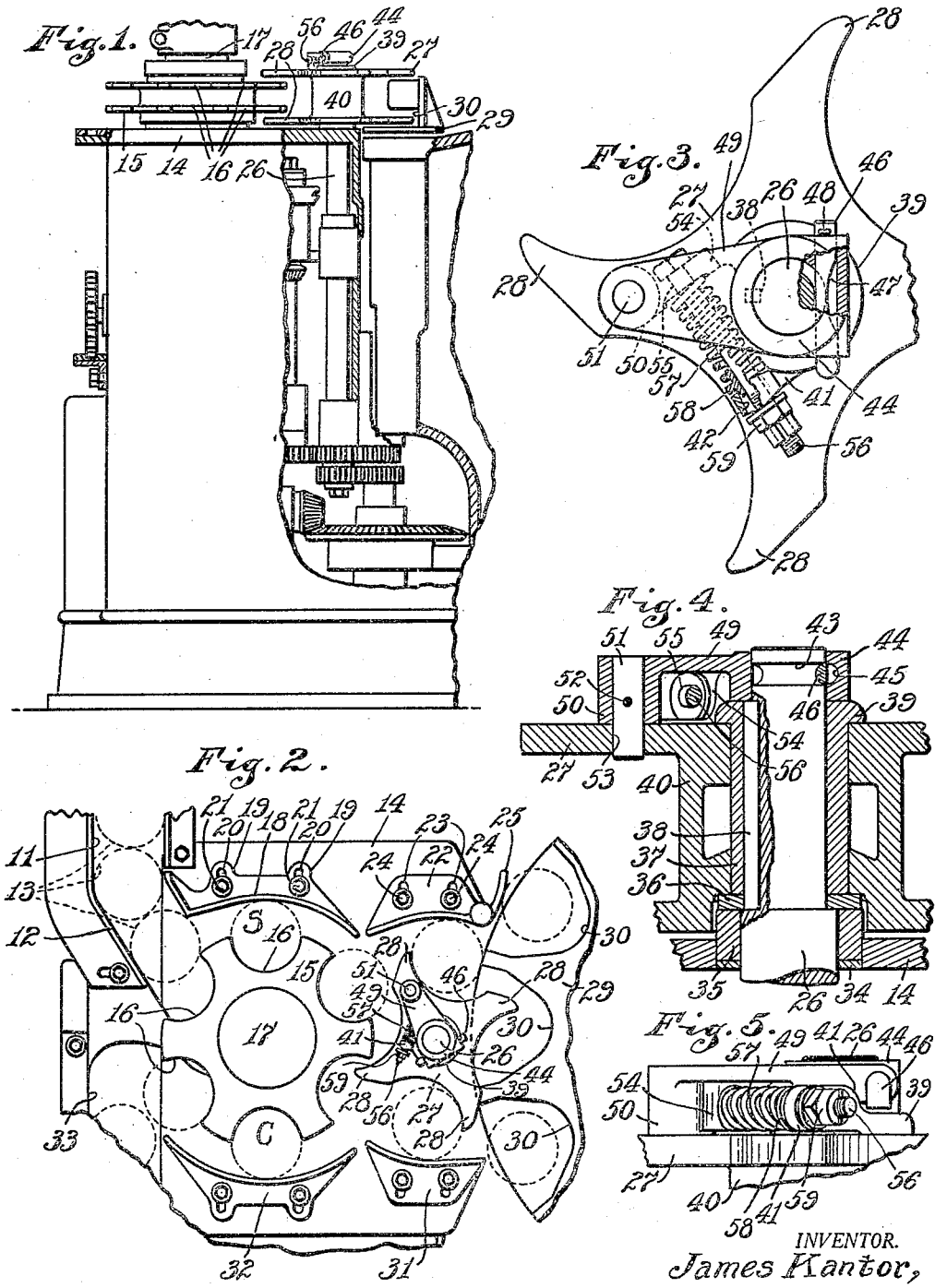
INVENTOR.
James Kantor,
BY
Hood + Hahn
ATTORNEYS Patented Jan. 10, 1933

1,893,746

UNITED STATES PATENT OFFICE

JAMES KANTOR, OF CHICAGO, ILLINOIS, ASSIGNOR TO THE LIQUID CARBONIC CORPORATION, OF CHICAGO, ILLINOIS, A CORPORATION OF DELAWARE

PROPELLER FOR BOTTLE FILLING MACHINES

Application filed July 16, 1930. Serial No. 468,352.

The present application relates to machines for handling bottles, or the like, and more particularly to the propelling mechanism therefor. The primary object of the invention is to provide means for preventing injury to the mechanism due to variation in bottle sizes or to slight inaccuracies of indexing. Further objects of the invention will appear as the description proceeds.

Machines of the character to which the present invention relates include a conveyer and a rotary table adapted to receive the bottles, or like articles, and to carry them from one station to another. Means are provided for moving the bottles from the conveyer onto the table, and for moving the bottles from the table, after the completion of the cycle through which the bottles are carried on the table, to another conveyer. In the accompanying drawing, there are illustrated parts of a machine for filling and capping bottles, the drawing illustrating the handling mechanism above described.

Fig. 1 is a side elevation of a fragment of the machine, parts thereof being broken away for clarity of illustration;

Fig. 2 is a plan view of such fragment;

Fig. 3 is a plan, on an enlarged scale, of an element;

Fig. 4 is a substantially central section through said element and its connected parts; and Fig. 5 is an enlarged elevation of a detail.

In the drawing, there is shown a conveyer channel 11 guarded by a guide strip 12, the conveyer in said channel being adapted to move bottles 13 onto a table 14 above which is mounted a star wheel 15 formed with pockets 16 and secured to a shaft 17 to be driven thereby. As will be obvious, the bottles 13 are moved into the pockets 16 and, as the shaft 17 rotates the star wheel 15 in a clockwise direction, the bottles are carried around past a guide strip 18. Said strip 18 is preferably formed with lugs 19 having slots 20 therein through which are passed bolts 21 for adjustably clamping said strip 18 in position.

In the machine illustrated, the shaft 17 is driven intermittently and is so indexed as to stop with one of the bottles in the position marked S, in which position said bottle is in registry with a syruping device which injects a charge of syrup into the bottle. As will be obvious, another bottle is simultaneously stopped in the position indicated by the letter C, wherein such bottle is in registry with a crowning mechanism.

Adjacent the end of the strip 18 there is mounted a second guide strip 22, said strip being formed with slots 23 through which project bolts 24 whereby said strip may be adjustably secured to the table 14. The guide strip 22 is provided with a finger 25 for a purpose later to be described.

A shaft 26 is mounted in parallel relation with the shaft 17 and carries a second star wheel 27 the arms 28 of which overlap the arms of the star wheel 15. The shaft 26 is continuously driven in a clockwise direction, and the arrangement is such that, as one bottle is moved into the syruping position, another bottle is moved into position to be engaged by an arm 28 of the star wheel 27, and moved by said arm past the guide strip 22 and into a pocket 30 of the rotary table 29, said table being continuously revolved in a clockwise direction. The finger 25 is so located as to engage any bottle which is not properly entered in its pocket 30 and to move it to its proper position.

The table 29 carries the bottles into cooperative relation with filling mechanism which, since it forms no part of the present invention, is not illustrated.

After the bottle is filled, it is carred by the table 29 back into a position to be engaged by an arm 28 of the star wheel 27, and such arm carries the bottle out of the pocket 30, past a guide strip 31 similar to the guide strip 22, and deposits it in one of the pockets 16 of the star wheel 15.

As will be obvious, the indexing of this mechanism must be quite accurate in order to avoid jamming. Even with absolutely accurate indexing, however, jamming may occur due to variations in the sizes of the bottles. Of course, neither the filling machine manufacturer nor the bottler can control bottle sizes closely, and it has been found in practice that an occasional outsize bottle will slip through even the most rigid inspections.

Even a casual inspection of the drawing in the present application will make it clear that a bottle which is, for instance, more than about one-eighth of an inch oversize in diameter will become lodged between the arm 28 of the star wheel 27 and the arm of the star wheel 15. Since the star wheels 15 and 27 are both rotating in a clockwise direction, adjacent portions of said wheels are moving in opposite directions. If a bottle so lodged happens to be strong enough not to be broken in the jam, serious damage to the machine may result.

While safety devices have been provided in the past in an attempt to overcome this danger, experience has shown that none of these are absolute safeguards. The most commonly used safety device is a friction clutch between the drive and the shaft 26, but it has been found that unscrupulous or ignorant operators will often tighten these clutches to such an extent that they do not slip in the event of a jam.

To provide an absolute safeguard against this danger, mechanism has been devised as follows. The shaft 26 projects through an aperture in the table 14, said aperture receiving bushings 34 and 35, and said shaft being formed with an upwardly facing shoulder upon which, and on the bushing 35, there rests a washer 36. A sleeve 37 is mounted on the shaft 26 and rests upon the washer 36, said sleeve and washer being keyed to the shaft 26 by a key 38. The star wheel 27 has its hub 40 journalled on the sleeve 37, the upper end of said sleeve being peened over, as at 39, onto the upper surface of the star wheel 27. An arm 41 projects laterally from the upper end of the sleeve 37, and above the star wheel 27, said arm being formed at its outer end with an aperture 42 which is preferably flared as shown.

Adjacent the upper extremity of the shaft 26 and beyond the end of the sleeve 37, said shaft is formed with an annular groove 43. A collar 44 is journalled on said shaft end, resting upon the upper end of the sleeve 37, and said collar is formed with a transverse bore 45 for the reception of a pin 46 which, intermediate its ends, is formed with a radiused recess 47. As will be obvious, when the pin 46 is in the position of Figs. 3 and 4, it engages in the groove 43 to prevent relative axial movement between the collar 44 and the shaft 26, and said pin is normally held in such position by a retaining member 48. If, however, the pin 46 is rotated through 180 degrees about its axis, the radiused portion 47 comes into registry with the shaft 26 to permit the collar 44 to be moved axially with respect to the shaft.

An arm 49 projects laterally from the collar 44 and is formed with a depending portion 50 at its end, said portion 50 engaging the upper surface of the star wheel 27. An aperture in said end of said arm 49 is adapted to receive a pin 51 extending through said aperture and into an aperture 53 in the star wheel 27, thus holding the arm 49 and the star wheel 27 against relative rotation about the axis of the shaft 26. Said pin 51 may be held in place by a screw 52.

The arm 49 is formed with a depending lug 54 apertured as at 55 for the reception of a bolt 56, said bolt extending also through the aperture 42 of the arm 41. A coiled spring 57 is sleeved on the bolt 56 and abuts at its one end against one face of the lug 54 and at its opposite end against a collar 58 on the bolt 56, said collar abutting the adjacent face of the arm 41. The head of the bolt 56 abuts the face of the lug 54 opposite that face which is engaged by the spring 57, and a nut 59 is threaded on the free end of the bolt 56 and engages that face of the arm 41 opposite the face which is engaged by the collar 58.

As will be obvious, the only driving connection between the shaft 26 and the star wheel 27 is through the arm 41, the spring 57, the lug 54, the arm 49, and the pin 51, the bolt 56 being slidable in the apertures in the arm 41 and lug 54. Thus the driving connection between the shaft 26 and the star wheel 27 is a resilient one, permitting lost motion of the shaft 26 with respect to the star wheel 27 in the direction of rotation of said shaft. Thus, if a bottle becomes lodged between an arm 28 of the star wheel 27 and an arm of the star wheel 15, the spring 57 will give to permit the bottle to be carried by the star wheel 15 out of engagement with the arm 28 of the star wheel 27, whereafter the spring 57 will expand to move the nut 59 once more into engagement with the arm 41, thus bringing the star wheel 27 into its proper indexing relation with the rest of the mechanism.

The bottle is carried by the star wheel 15 past the guide strip 32, stopping at the position indicated at C to permit crowning of the bottle, and thence into a second conveyer channel 33 through which the bottle is carried to the boxing station.

It will be seen that I have provided not only means for preventing jamming of bottles between the star wheels 15 and 27, but also means whereby very delicate indexing adjustment of the star wheel 27 may be effected. Heretofore, the only means of adjusting the indexing of said star wheel with respect to the other elements of the machine has been through relative movement of the driving gears, and the delicacy of such adjustment has, of course, been limited by the spacing of the teeth of said gears. It will be seen, however, that adjustment of the nut 59 on the bolt 56 varies the position of the star wheel 27 with respect to its shaft 26, and that there is nothing to limit the delicacy of this adjustment.

I claim as my invention:

1. In a machine for handling bottles, or the like, a star wheel, a second star wheel adapted to move articles into cooperative relation with said first star wheel, means for rotating said star wheels in directions such that adjacent portions of said wheels move in opposite directions, and a lost-motion connection between one of said wheels and its driving means, said connection comprising a spring normally holding said one wheel in a given relation with the driving means therefor and operable, after distortion of said spring, to return said one wheel to normal position.

2. In a machine for handling bottles, or the like, a star wheel, a shaft, a second star wheel freely mounted on said shaft and adapted to move articles into cooperative relation with said first star wheel, means for rotating said first star wheel and said shaft in the same direction, and a spring connected to said second star wheel and secured to said shaft.

3. In a machine for handling bottles, or the like, a star wheel, a second star wheel adapted to move articles into cooperative relation with said first star wheel, the arms of one of said wheels overlapping the arms of the other of said wheels, means for rotating said wheels in directions such that overlapping arms of said wheels move in opposite directions, and a resilient connection between one of said wheels and its driving means, said connection comprising a spring normally holding said one wheel in a given relation with the driving means therefor and operable, after distortion of said spring, to return said one wheel to normal position.

4. In a machine for handling bottles, or the like, a star wheel, means for effecting a step-by-step rotation of said star wheel, a shaft mounted parallel to the axis of said star wheel, means for continuously rotating said shaft, a second star wheel mounted on said shaft and adapted to move articles into cooperative relation with said first star wheel, and means resiliently connecting said second star wheel to be driven by said shaft, said connecting means being arranged to counteract momentary relative movement between said shaft and said second star wheel.

5. In a machine for handling bottles, or the like, a star wheel, means for effecting a step-by-step rotation of said star wheel, a shaft mounted parallel to the axis of said star wheel, means for continuously rotating said shaft, a second star wheel freely mounted on said shaft, a sleeve keyed to said shaft and having a laterally projecting arm, and resilient means connecting said arm and said second star wheel.

6. In a machine for handling bottles, or the like, a star wheel, means for effecting a step-by-step rotation of said star wheel, a shaft mounted parallel to the axis of said star wheel, means for continuously rotating said shaft, a second star wheel freely mounted on said shaft, a sleeve keyed to said shaft and having a laterally projecting arm, and means resilient in one direction only connecting said arm and said second star wheel.

7. In a machine for handling bottles, or the like, a star wheel, means for rotating said star wheel, a shaft mounted parallel to the axis of said star wheel, means for rotating said shaft in the direction in which said star wheel is rotated, a second star wheel mounted on said shaft, and adapted to move articles into cooperative relation with said first star wheel, and resilient means constituting the sole driving connection between said shaft and said second star wheel, said resilient means being arranged to counteract momentary relative movement between said shaft and said second star wheel.

8. In a device of the class described, a shaft, means for rotating said shaft, a sleeve keyed to said shaft, a laterally projecting arm on said sleeve and formed with an aperture therethrough, a star wheel journalled on said sleeve, a collar mounted on said shaft, means preventing relative axial movement between said collar and said shaft, an arm projecting laterally from said collar, means preventing relative rotation between said collar and said star wheel, an apertured lug on said arm, a headed bolt passing through the apertures of said arm and said lug and slidably received therein, a coiled spring sleeved on said bolt and abutting the adjacent faces of said apertured arm and said lug, and a nut on said bolt and abutting the opposite face of one of said apertured members.

9. In a device of the class described, a shaft, means for rotating said shaft, a sleeve keyed to said shaft, a laterally projecting arm on said sleeve and formed with an aperture therethrough, a star wheel journalled on said sleeve, a collar mounted on said shaft, means preventing relative axial movement between said collar and said shaft, while permitting relative rotation therebetween, an arm projecting laterally from said collar, a pin engaging said last-mentioned arm and said star wheel, an apertured lug on said arm, a headed bolt passing through the apertures of said arm and said lug and slidably received therein, the diameter of said bolt being materially less than the diameter of the aperture through said arm, a coiled spring sleeved on said bolt and abutting the adjacent faces of said apertured arm and said lug, and a nut adjustably mounted on said bolt and abutting the opposite face of one of said apertured members.

10. In a machine for handling bottles, or the like, a star wheel, means for effecting step-by-step rotation of said star wheel, a shaft mounted parallel to the axis of said star wheel, means for rotating said shaft in the direction of rotation of said star wheel, a sleeve keyed to said shaft, an arm projecting laterally from said sleeve and formed with an aperture, a second star wheel journalled on said sleeve and adapted to move articles into cooperative relation with said first star wheel, a collar journalled on said shaft, means preventing relative axial movement of said collar and shaft, an arm projecting laterally from said collar and pinned to said second star wheel, an apertured lug on said arm, a bolt slidably received in the apertures of said lug and arm, a coiled spring sleeved on said bolt and abutting the adjacent faces of said lug and apertured arm, and means on said bolt engaging said apertured members for limiting the degree of separation of said apertured elements.

11. In a machine for handling bottles, or the like, a star wheel, a second star wheel adapted to move articles into cooperative relation with said first star wheel, means for rotating said star wheels in directions such that adjacent portions of said wheels move in opposite directions, resilient means forming the sole driving connection between one of said wheels and its rotating means, said resilient means being arranged to counteract momentary relative movement between said one wheel and its rotating means, and means for adjusting the index relation of said one star wheel with respect to its driving means and to said other star wheel.

12. In a machine of the class described, a pair of parallel shafts, means for driving said shafts in the same direction, a star wheel mounted on one of said shafts, a second star wheel mounted on the other of said shafts for cooperation with said first star wheel, resilient means forming the sole driving connection between one of said wheels and its shaft, said resilient means being arranged to counteract momentary relative movement between said one wheel and its shaft, and means for rotatably adjusting said one wheel on its shaft to a degree less than the peripheral distance between adjacent arms of said one wheel.

13. In a machine of the class described, a pair of parallel shafts, means for driving said shafts, a star wheel secured on one of said shafts, a second star wheel loosely mounted on the other of said shafts and overlapping said first star wheel, and means operatively connecting said second star wheel to its shaft, comprising a projecting arm on said shaft, a projecting arm on said second star wheel, spring means associated with said arms and urging the same apart, and adjustable means limiting the degree of separation of said arms.

14. In a machine of the class described, a pair of parallel shafts, means for driving said shafts, a star wheel secured on one of said shafts, a second star wheel loosely mounted on the other of said shafts and overlapping said first star wheel, and means operatively connecting said second star wheel to its shaft, comprising a projecting arm on said shaft, a projecting arm on said second star wheel, each of said arms being formed with an aperture, a headed bolt loosely received in the apertures of said arms, a spring sleeved on said bolt between said arms and abutting said arms to urge separation thereof, and a nut threadedly engaged on said bolt, said arms being embraced between the head of said bolt and said nut.

In witness whereof, I, JAMES KANTOR, have hereunto set my hand at Chicago, Illinois, this 12 day of July, A. D. one thousand nine hundred and thirty.

JAMES KANTOR.